United States Patent [19]

Hills

[11] 3,982,349

[45] Sept. 28, 1976

[54] FISHING LURE

[76] Inventor: William H. Hills, 25 Woodhull Road, East Setauket, N.Y. 11733

[22] Filed: Mar. 29, 1974

[21] Appl. No.: 456,063

[52] U.S. Cl............................... 43/42.48; 43/42.39
[51] Int. Cl.².......................................... A01K 85/00
[58] Field of Search............. 43/42.48, 42.36, 42.39, 43/42.37, 42.19, 42.22, 42.32, 42.45, 42.46, 44.9

[56] References Cited
UNITED STATES PATENTS

| | | | |
|---|---|---|---|
| 1,832,172 | 11/1931 | Winter | 43/42.34 |
| 2,516,468 | 7/1950 | Klein | 43/42.08 |
| 2,829,462 | 4/1958 | Stokes | 43/42.48 |
| 2,840,946 | 7/1958 | Lachicotte | 43/42.48 |
| 2,986,838 | 6/1961 | Smyser | 43/42.36 |
| 3,507,070 | 6/1970 | Rossello | 43/42.36 |

Primary Examiner—Louis G. Mancene
Assistant Examiner—Peter K. Skiff
Attorney, Agent, or Firm—Roberts & Cohen

[57] ABSTRACT

A fishing lure which comprises an elongated generally cylindrical body including opposite ends, one of which is hemispherical and the other of which is provided with intersecting sloped surfaces which intersect along a line forming one extremity of the lure. Hooks are connected to the body as, for example, centrally of the same and at one end thereof. The body is provided with a concealed weight which, due to the hemispherical form of the body is enabled to extend substantially to one extremity of the body. The sloped surfaces perform two functions, namely, that of improving aerodynamical design and of improving the performance of the lure when retrieved along the surface of the body of water.

16 Claims, 5 Drawing Figures

U.S. Patent  Sept. 28, 1976  3,982,349
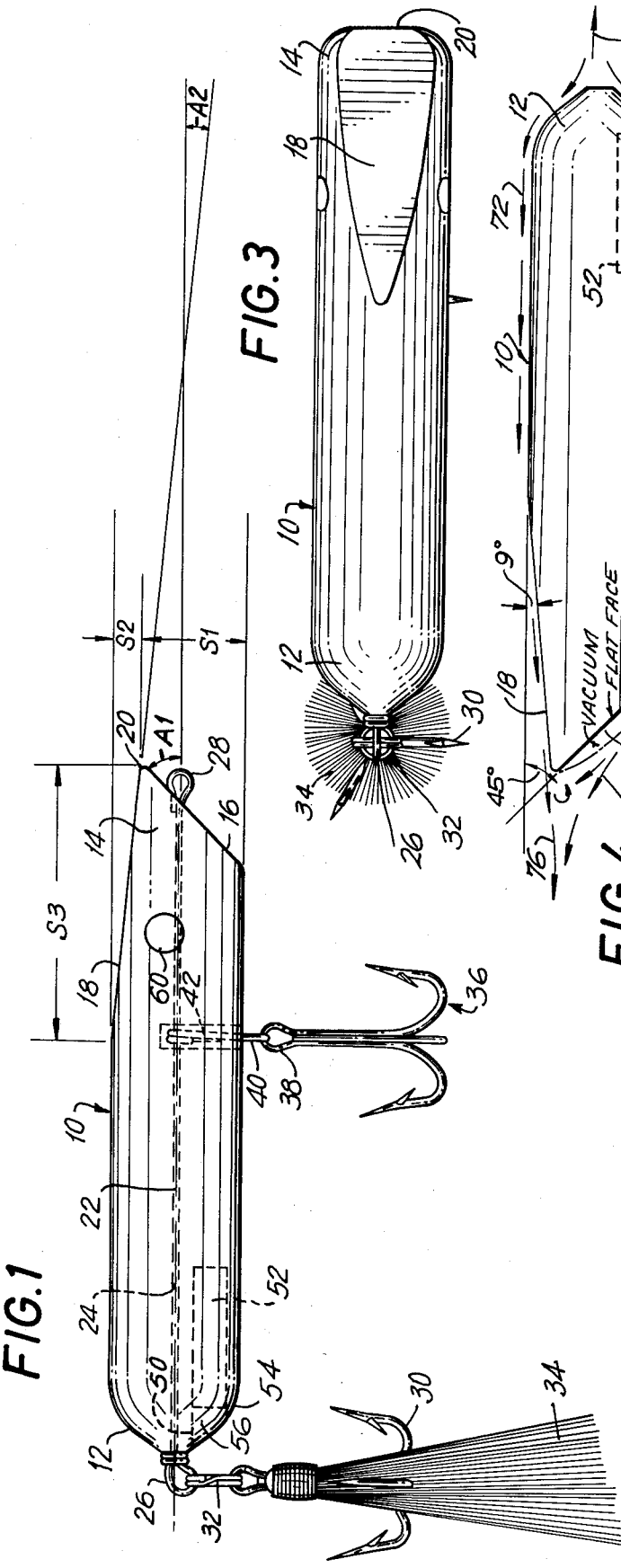

FISHING LURE

FIELD OF INVENTION

This invention relates to fishing lures.

BACKGROUND

A wide variety of fishing lures are known which have met with commercial success while being nevertheless subject to various deficiencies. One of these deficiencies resides, for example, in the fact that some of the known lures are of a material which tends to be crushed or broken when subjected to abuse such as, for example, when cast against a hard object or hit by fish with teeth.

Another deficiency of known lures resides in the aerodynamic form thereof. Thus, with respect to the casting of lures, there are two aerodynamic problems to consider.

One problem relates to the distance of casting and hence to the minimizing of resistance to air. The other problem relates to the accuracy of casting.

With respect to the casting of lures, it is also to be noted that, when a lure is cast, the end of the lure which, during retrieval, is normally the leading end becomes the trailing end and the trailing end becomes the leading end. This is a reversal of roles so that there is one attitude for movement through water during retrieval and an opposite attitude for movement through air during casting.

The prior art lures do not account for this reversal of roles and do not utilize forms which serve to advantage in both the casting and retrieving of lures. Disadvantageously, the prior art lures appear to concentrate chiefly on the retrieval of lures in an effort to optimize surface movement and sound production, when relatively small but important changes in form would be effective to improve casting and improve surface movement.

The prior art lures, furthermore, suffer other disadvantages as will appear more fully hereinafter. These include, without limitation, the inability to stand up under the corrosive action of water, especially salt water, and so forth.

SUMMARY OF INVENTION

It is an object of the invention to provide an improved lure and method for making the same.

It is a further object of the invention to provide an improved lure having improved aerodynamic qualities to provide for improved accuracy and distance of casting.

Yet a further object of the invention is to provide improved aerodynamic qualities while preserving and indeed improving the retrieval characteristics of the lures of the invention.

Still other objects of the invention, as will be explained more fully hereinafter, relate to improving lure durability and realism, the waterproofing of lures, the resistance thereof to corrosion and so forth.

To achieve the above and other objects of the invention there is provided a fishing lure comprising an elongated generally cylindrical body including first and second ends. The first end is at least substantially hemispherical. The second end is provided with first and second sloped surfaces intersecting along a line forming one extremity of the body. Hook means are connected to the body.

The aforesaid body has a longitudinal axis of symmetry and the first and second surfaces respectively and preferably form angles of 40°–50° and 6°–12° with the axis of symmetry.

The body has preferably at least a substantially constant diameter between the aforesaid surfaces at the second end and the hemispherical first end. The first surface extends transversely of the body by about three-quarters of the diameter.

The body is furthermore provided with an opening extending from the hemispherical end and the lure furthermore comprises a weight concealed in this opening and lying in part within the hemispherical end.

In the aforesaid construction the weight may be an elongated metal piece extending parallel to the axis of symmetry and less than half way along the body.

The aforesaid above-mentioned surfaces are at least substantially flat and the line at which the surfaces intersect lies in a plane which is perpendicular to the axis of symmetry.

Preferably, the aforesaid angles are about 45° plus or minus 3° and 9° plus or minus 3° respectively.

Advantageously, the aforesaid body is made of a hardwood such as white birch, beech or maple. A coat of polyurethane varnish is applied to the hardwood to seal the same. A coat of alkyd paint is provided on the coat of varnish and a further coat of polyurethane varnish is provided over the paint. Additional protective coats may also be provided.

Advantageously, a stainless steel wire extends completely through the body along the axis of symmetry and loops are located on this wire at opposite extremities and outside of the body to lock the wire therein. One of the loops constitutes a line attachment means.

The hook means mentioned hereinabove may include treble stainless steel hooks connected to the loop at the first end of the body. The hook means may furthermore include a second treble stainless steel hook arrangement, and means extending regularly through the body to connect the second arrangement to the wire at a position between the loops.

The body may advantageously be provided with indentations symmetrically disposed on opposite sides of the body towards the second end in order to simulate eyes.

Advantageously, the second surface mentioned above may extend longitudinally along approximately 35–45% of the body.

the above and further objects, features and advantages of the invention will be found in the following detailed description as illustrated in the accompanying drawing.

BRIEF DESCRIPTION OF DRAWING

In the drawing:

FIG. 1 is a side view of a lure provided in accordance with a preferred embodiment of the invention;

FIG. 2 is a front view of the lure illustrated in FIG. 1;

FIG. 3 is a top view of the lure illustrated in FIG. 1;

FIG. 4 is a diagrammatical view of the lure of the invention illustrating the aerodynamic principle thereof; and FIG. 5 is a view of a prior art lure illustrating the comparative aerodynamic principle.

DETAILED DESCRIPTION

Even though the entire design of a lure is important, there are vital areas where superior design or quality of material can make a major difference. The most important, of course, is the body.

The lure of the invention is significantly different in its aerodynamic shape. It was developed with the intention of enabling better casting than with any other popper. One main difference is in the tail (which when cast is the leading edge). The tail is symmetrically rounded in order to pierce air uniformly and is not elongated as in other designs. As will be shown, an elongated tail tends to drive the lure in one or another direction. The rounded shape also allows an inserted lead to be placed closer towards the tail extremity so that, when the tail becomes the leading edge in flight, its weight is placed to have more of a pulling effect than if placed more towards the center. A centrally located weight can cause the lure to wobble more.

Also important, especially when used in conjunction with the tail design, is the shape of the nose. In almost all commercially available popping plugs, the nose extends out straight along the body and ends with a 56°–58° downward angle towards the lower part of the lure. The resulting face is hollowed out to form a dish effect (an inverted hollow) which gives the lure a gurgling sound when popped on the surface. Two things are important to note:

1. The air flow when the prior lure is in flight comes off the lure and has to narrow. With a straight line on top and bottom of the lure, this takes time and distance for air to come together thus creating a vacuum.

2. With the concave design of the face, another large vacuum forms and thus the vacuum problem magnifies, and a reverse pressure is developed. When the lure is in flight, the suction created significantly retards the forward thrust and also enhances the wobble effect created by the weight distribution. Both the vacuum and wobble cut the distance through which the lure is able to fly as well as its accuracy.

A lure of the invention, however, has an approximately 45° angle cut, but there is no concave area—the nose is flat. More important, approximately one-third of the top forward section of the lure is sloped forward so that it meets the front cut approximately one-fourth of the way down. This effect narrows the nose. When such a lure is cast, the nose (now the trailing area) has the air flow come down the lure and follow the smoothly dropping area. With this narrow area of flow, plus the flat nose where the air tends to follow the lure configuration, the amount of vacuum (reverse pressure) is very drastically reduced so that the flight is almost unimpaired. This in conjunction with the weight-forward effect allows the lure to fly significantly further with little wobble. This is of great value to fishermen. This superior casting is even more obvious when the wind is blowing and most lures are very difficult to cast.

The flat face of the lure of the invention in contrast to the concave design allows the lure when worked or popped to jump or move with a side-to-side motion as well as forward which, during retrieval, imitates a crippled fish better than a straight move which results from the concave conformation. Another point is the flat face causes a splash that is not limited or confined as with the concave face (a concave face forces the water directly forward). The total casting and retrieving effect is thus quite effectively better because of all the above.

Another vital area of improvement is that the body of the lure is hardwood (for example, kiln dried and aged birch) in contrast to most popping lures which are of plastic such as either polypropylene or polystyrene. When cast against hard surfaces or hit by fish with teeth (e.g., bluefish), the lure of the invention holds up far better. Plastic materials, to maintain a lower weight, are air filled by mechanical or chemical design and tend to be crushed or broken or leak when subjected to hard abuse. Hardwood will take a tremendous beating.

Referring next to the drawing, it is seen that the fishing lure of the invention comprises an elongated generally cylindrical body 10 including a first end 12 and a second end 14. During a lure retrieving operation, the end 14 is the nose or leading end, and the end 12 is the trailing end or tail. During a casting operation there is a reversal of roles and the end 12 becomes the leading end or nose and the end 14 becomes the trailing end.

The first end 12 is at least substantially hemispherical in shape, and preferably, in accordance with the invention, the shape of the end 12 is as close to hemispherical as possible. The second end 14 is provided with a first sloped face 16 and with a second sloped face 18. The sloped surfaces intersect along a line 20 which forms one extremity of the body 10.

The body 10 has a longitudinal axis of symmetry 22 and a bore 24 extends through the body along this axis of symmetry. Through the bore 24 extends a stainless steel wire having loops 26 and 28 at opposite extremities thereof. The loops 26 and 28 serve to lock the wire in the bore 24 and also afford a means of making various connections to the body. Thus, for example, a fishing line or leader may be connected to the loop 28 which therefore constitutes a line attachment whereas a treble stainless steel hook arrangement 30 may be connected to the loop 26 through the intermediary of a stainless steel split ring 32.

The treble hook arrangement 30 is preferably of stainless steel in order to resist corrosion due to the effects of water and particularly salt water. The hooks are concealed by tufts of a natural or synthetic hair and preferably Dynel hair, as indicated at 34.

A second treble hook arrangement is indicated at 36. This treble hook arrangement is similarly of stainless steel in order to avoid the consequences of corrosion. The hook arrangement 32 includes an eye 38 which, in turn, is connected to a stainless steel loop 40 on a wire 42 which extends radially through the body 10 to make engagement with the internal wire extending through the body approximately midway of the body 10.

Referring again to the surfaces 16 and 18, these surfaces are preferably, as has been generally indicated above, flat surfaces without concavities therein. The first surface 16 forms an angle A1 of 40°–50° with the longitudinal axis of symmetry 22. This angle is more particularly and preferably an angle of 45° plus or minus 3°.

The surface 18, on the other hand, forms an angle A2 of 6°–11° with the upper surface of the lure and, therefore, with the axis of symmetry 22. More particularly, this angle is preferably an angle of 9° plus or minus 3°. Surface 18 extends rearwardly of the eyes 60.

As has been noted hereinabove, the surface 18 is also a flat surface void of concavities and it intersects with the surface 16 along line 20. Line 20 lies in a plane which is perpendicular to the axis 22. Both surfaces 16 and 18 therefore are perfectly square to the angle of travel of the lure 10 through the water aside from when the lure is making side-to-side excursions.

The body 10 has an at least substantially constant diameter between the surfaces at the end 14 and the hemispherical first and 12. The first surface 16 preferably extends transversely of the body 10 by a distance S1 which is approximately threequarters of the diameter of the body 10. The surface 18 extends a transverse distance S2 which occupies the remaining one-quarter of the diameter.

The body 10 is moreover provided with a bore 50 which extends rearwardly from the end 12 in a direction which parallels that of the axis 22, and is relatively close to the bottom edge of the lure. Within the bore 50 is concealed a lead weight 52, the end corner 54 of which lies approximately flush with the outer surface of the body 10. The concealed weight is hidden from view by means of a filler indicated at 56 which holds the weight in position while preserving the smoothness of the exterior of the lure. It will be noted that by reason of the hemispherical shape of the end 12 that the weight 52 can extend very nearly to the one extremity of the body 10. This means that when the end 12 is the leading end of the lure, as occurs during a casting operation, the weight 52 is very nearly at the leading extremity and thus exerts a pulling force on the balance of the lure in order to prevent or minimize wobbling and to provide for optimizing the accuracy of the cast as well as the magnitude of the distance of the cast. Other advantageous benefits of the shape of the lure will be discussed hereinafter.

The weight 52 may be for example of lead and may be generally an elongated cylindrical metal piece extending, as noted above, parallel to the axis 22 and preferably less than half way along the body 10.

The body 10 is preferably fabricated of a hardwood such as white birch or, as alternative, beech or maple. The wood is preferably kiln dried and aged and may be for example, in the raw state, dowels, which are 1 inch × 4 inches, or 4 × ½ inch, or ⅞ inch × 3 & ½ inch or ¾ inch × 3 inches. The use of this hardwood has been found remarkably superior to the use of plastics which are more susceptible to chipping, cracking, and otherwise being abused by being cast against hard objects or upon being attacked by fish with teeth, such as for example, bluefish.

To form the lures, the dowels are end drilled with, for example, a 7/64 inch drill with the lead holes being drilled in parallel in a similar drilling operation. The end 12 is chucked off to the specified shape with a chucking head, and the nose end 14 is first cut to the 45° angle followed by the forming of the surface 18. Then a pre-cut lead or similar weight is inserted into the hole 50 and the hole is filled with a compound which is adapted to adhere to wood under the adverse conditions experienced by the lure during alternate exposure to water and atmosphere, as is the normal experience of a lure. The concealing compound is sanded off smoothly to maintain the end configuration of the lure. The surface 18 may be formed such as by sanding. Eye holes or indentations 60 are then formed in the lure.

Thereafter, the hardwood of the lure is dipped in a primer varnish, as will be discussed in greater detail hereinafter. Within twelve to twenty hours the lures are re-dipped in a pigmented varnish to give the first finished coat. After four to six hours an alkyd paint is sprayed on in order to give the desired colored combination and, for example, one to four colors may be employed. Thereafter, in about eight to twelve hours, a final coat of urethane varnish may be added for paint and lure protection. The final drying time may be, for example, 60 hours, but this time can be reduced to six to twelve hours. The eye holes are filled with enamel paint.

The lure is then drilled radially to accept the wire 42 and the additional treble hook optionally connected to this wire.

The length of the surface 18 longitudinally along the body 10 is indicated at S3. This length is preferably arranged to be approximately 35–45% the length of the body 10. The longitudinal extent of the surface 16 is half or less of the extent of the surface 18.

Referring again to the material from which the body 10 is made, these are preferably close grained hardwoods whose specific gravities based on volume when green are as follows:

| | |
|---|---|
| White birch | — 0.55 |
| Beech | — 0.56 |
| Maple | — 0.57 |

These woods are employed based on the relationship of their buoyancy factor to their hardness.

Referring now to the surface 16, this is as noted above preferably at an angle of 45° plus or minus 3° relative to the axis 22. At 40° or less the angle would be shallow enough to decrease water push and surface action effectiveness. At an angle in excess of 50° the improved aerodynamic effect upon the flight of the lure would be decreased.

The depth of the hole 50 and the length of the metal insert 52 is designed to place the metal insert as close as possible to the extremity of the end 12, while leaving enough room to insert the concealing compound indicated at 56 which holds the weight in place and keeps it from being exposed while permitting a sanding off to a smooth exterior surface. The weight may be, for example, 1/32 inch –⅛ inch below the rounded surface. The position of the weight is an important factor in overall performance of the lure. It adds the desired weight and because of its two positions (weight back and low), it acts as a stabilizer or keel and causes the lure to perform in a superior manner.

The primer system referred to hereinabove is intended to stand up to the punishment of salt water, as well as to the expansion and contraction of the wood. Preferably, there is employed a polyurethane varnish with a white pigment and a solvent which gives a good wood penetration and adhesion. The polyurethane varnish Varathane produced by Flecto Company of California gives excellent results. This primer system yields substantially no cracking or chipping, and a far better adhesion than that which is normally experienced. A re-dipping may be effected with a pigmented polyurethane reduced with a solvent which becomes the first finished coat. It will adhere extremely well to the primer coat. The second coat referred to may also be of Varathane.

The alkyd paint which is employed is a synthetic drying oil paint and is commercially available in a can or spray form. One alkyd paint which has been employed with success is Whiz-On supplied by New York Bronze Powder Company of Elizabeth, New Jersey. Other color spray systems may also be employed.

The final coat preferably employed is polyurethane varnish which may be either the Varathane mentioned hereinabove or Last & Last by Absolute Products of Bronx, New York. The above materials applied correctly within the designated times mentioned hereinabove will bond together extremely well, giving a homogeneous bond.

Referring next to FIGS. 4 and 5, the aerodynamic possibilities of the lure of the invention as compared with those of the prior art are to be readily observed. In FIG. 4 the body 10 has its end 12 in leading direction according to direction cast. Due to the sloping surfaces 16 and 18, the air will pass along the body of the lure, as indicated by arrows 70 and 72 and will smoothly merge as indicated at 74 and 76. A minimal or no vacuum will be present, as indicated at 78.

In the lure, as appears in FIG. 5 according to the prior art, the body 80 is elongated and has at the trailing end thereof a concave face 82, as is conventional with prior art lures. the air flow passes a significant different distance along the length of the lure 80 as shown by arrows 84 and 86 and trails far beyond the lure as indicated by arrows 88 and 90, thereby creating a much larger area of vacuum as indicated at 92 which results both from the presence of the concave face 82 and the lack of the upper sloping surface in the area indicated generally at 94. At the same time, it will also be noted that the weight 52 in FIG. 4 is much further forward than is the weight indicated at 96 in FIG. 5.

The extreme reduction in vacuum force when the lure is in flight, as provided in accordance with the instant invention, significantly reduces the retarding effect and lets the lure fly easier and further. The shape of the tail lets the lure fly smoothly into the air with less variation because the more pointed tail of the prior art lure causes the lure to deflect more readily. The internal weight of the lure of the invention is located so close to the leading extremity of the lure in flight that it exerts much more of a pulling effect than the weight located in the lure of the prior art. The significant decreasing of the vacuum and the combination of the factor of the weight being much more forward than in the prior art lure, and the more bullet-like shaped tail all tend to provide a much more stable aerodynamic body in flight. The prior art lure frequently sets up a wobble action due to the vacuum formation and weight distribution and the deleterious results of this possibility are more obvious when a strong wind is present.

Upon retrieval action, with the lure in water, the flat face of the invention causes the water to splash in all directions, whereas the prior art lure splashes water only in a forward direction because of the concave face which is similar to a cupped hand pushing water forward. The flat faces of the invention also permit the lure of the invention to jump to both sides, thereby forming a side-to-side excursion for erratic action which is the more desirable type of action, whereas the lure of the prior art moves generally only in a forward direction due to the restrictive effects of the edges of the cupped or concave face.

It has been found that a lure of the invention which is lighter in weight than the prior art lure will fly as far or further than a prior art lure of heavier weight with equal lines and terminal tackle.

There will be obvious to those skilled in the art many modifications and variations of the construction set forth hereinabove. These modifications and variations will not depart from the scope of the invention if defined by the following claims.

What is claimed is:

1. A fishing lure comprising an elongated, generally cylindrical body including first and second ends, said first end being at least substantially hemispherical, said second end being provided with first and second sloped and at least substantially planer surfaces intersecting along a line forming one extremity of said body, hook means connected to said body, said first and second surfaces being upper and lower surfaces respectively, said upper surface being at a shallower angle than said lower surface, and line attachment means on said body and located at said lower surface, said body having a longitudinal axis of symmetry and said first and second surfaces respectively forming angles of 6°–12° and 40°–50° with said axis.

2. A lure as claimed in claim 1 wherein said body has a longitudinal axis of symmetry and said first and second surfaces respectively form angles of 6°–12° and 40°–50° with said axis.

3. A lure as claimed in claim 1 wherein said body has an at least substantially constant diameter between the surfaces at said second end and the hemispherical first end, said first surface extending traversely of said body by about three-quarters of said diameter.

4. A lure as claimed in claim 3 wherein said body is provided with an opening extending from the hemispherical end, comprising a weight concealed in said opening and lying in part within said hemispherical end.

5. A lure as claimed in claim 4 wherein said weight is an elongated metal piece extending parallel to said axis and less than half way along said body.

6. A lure as claimed in claim 4 wherein the line at which the surfaces intersect lies in a plane which is perpendicular to said axis and located above the same.

7. A lure as claimed in claim 4 wherein said angles are about 45°± 3° and 9°± 3° respectively.

8. A lure as claimed in claim 4 wherein said body is of hardwood.

9. A lure as claimed in claim 8 wherein said hardwood is white birch, beech or maple.

10. A lure as claimed in claim 8 comprising at least one coat of polyurethane varnish on said body to seal the hardwood.

11. A lure as claimed in claim 10 comprising a coat of alkyd paint on said coat of varnish and a further coat of polyurethane varnish over said paint.

12. A lure as claimed in claim 4 wherein said attachment means includes a wire extending through said body along said axis and loops at opposite extremities of said wire outside of said body.

13. A lure as claimed in claim 12 wherein said hook means includes a treble stainless steel hook arrangement connected to the loop at said first end of said body.

14. A lure as claimed in claim 13 wherein said hook means includes a second treble stainless steel hook arrangement and means extending radially through said body to connect the second arrangement to said wire at a position between said loops.

15. A lure as claimed in claim 4 wherein said body is provided with indentations symmetrically disposed on opposite sides of said body towards said second end to simulate eyes.

16. A lure as claimed in claim 4 wherein said second surface extends longitudinally along about 35–45% of said body.

* * * * *